March 15, 1932.   L. T. HAND   1,849,084
SIPHON PEN FOR RECORDING INSTRUMENTS
Filed Jan. 6, 1931
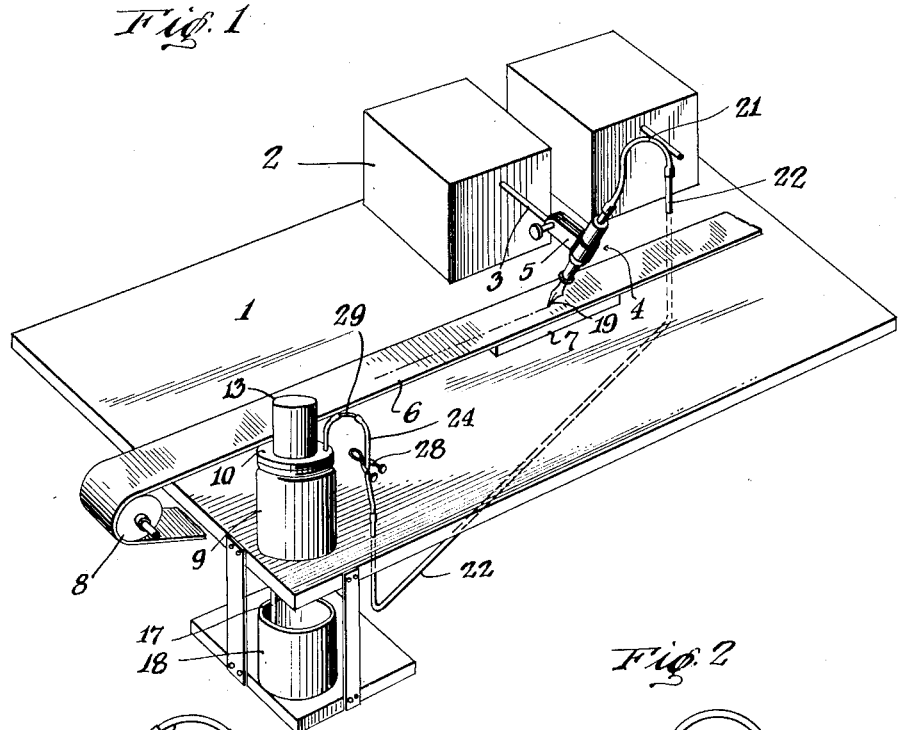
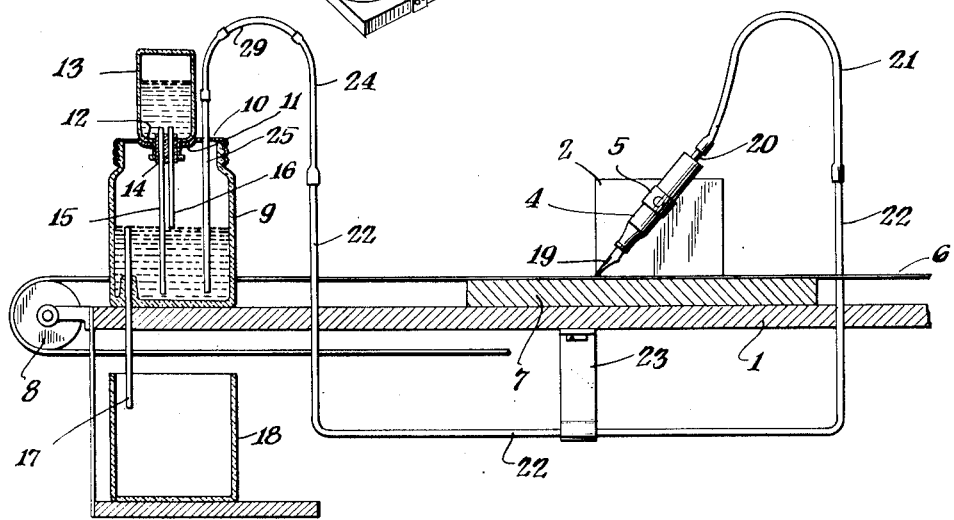
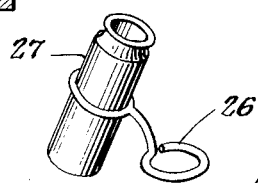
Inventor
Leslie T. Hand
By his Attorney
Frederick W. Barker Patented Mar. 15, 1932

1,849,084

UNITED STATES PATENT OFFICE

LESLIE T. HAND, OF BROOKLYN, NEW YORK

SIPHON PEN FOR RECORDING INSTRUMENTS

Application filed January 6, 1931. Serial No. 506,848.

This invention relates to means for maintaining a supply of ink to the pens employed in telegraphic recording instruments and my improvements are directed in particular to means for siphoning the ink to the recording pen from a service well, and barometric means for keeping a constant level of ink in the service well from a supply reservoir.

Other features and advantages of my invention will hereinafter appear.

In the drawings:

Figure 1 is a perspective elevation of a table supporting a recording instrument (diagrammatically indicated), with the pen, tape, and ink supply means.

Fig. 2 is a side sectional view thereof, and

Fig. 3 is a detail of the idle pen container.

In said views let 1 indicate a table which supports a recording instrument 2, an oscillating shaft 3 extending from said instrument and releasably carrying a pen 4 by means of a clamp 5.

The pen is adapted to mark a tape 6 that is movable along a support 7 and over rollers such as that indicated at 8. The table 1 also supports an ink well, here shown in the form of a jar 9, having a screw closure cap 10, said cap having a depression 11 therein to seat the shoulder 12 of an up-ended reservoir or bottle 13 that contains a further ink supply. The neck of bottle 13 contains a stopper 14, and tubes 15, 16 are extended through the stopper, the longer tube 15 serving to renew the supply in jar 9 when the ink level in the jar recedes below the air supply tube 16. Also an overflow tube 17 is provided, whose upper end lies within jar 9, in the plane of the normal ink level, said tube 17 extending through the bottom of jar 9 and through table 1, to deliver overflow ink into a receptacle 18.

The pen 4 is of tubular formation for delivering ink to the nib 19, and has a rearwardly extending hollow nipple 20, to be engaged by one end of a flexible rubber tube 21, whose other end engages one end of a U-shaped pipe 22. Said pipe 22 is extended through and below the table 1, means, such for example as a bracket 23, secured to the underside of the table, serving to support the pipe.

The other end of pipe 22 connects with a flexible rubber tube 24, and a pipe 25, extended from tube 24, is passed through cap 10 and into the ink in jar 9. Upon establishing a siphon in the pen by way of the intermediary pipes and tubes thereby continuous functioning of the pen is available.

A bracket 26, carrying a bottle 27 which contains ink, adapted to be placed on table 1, is adjacent the pen, to receive the pen when the latter is not in use, and has been released from clamp 5, to thereby close the siphon at such times and prevent the loss of ink while the instrument is inactive.

Also the siphon may be suspended by means of a clamp 28 applied as to the rubber tube 24.

For the purpose of providing visual indicating means that the siphon is working, a section of glass tubing 29, may be inserted in the rubber tubing 24.

Variations within the spirit and scope of my invention are equally comprehended by the foregoing disclosure.

I claim:

1. The combination with a fountain pen, of an ink well, an ink reservoir, means for maintaining a constant level of ink in said well, and siphonage means for communicating ink from said well to said pen.

2. A fountain pen adapted to be operated by a recording instrument, a supporting table, an ink well mounted on said table, a U-shaped pipe that is extended below said table, means for supporting said pipe from said table, a rubber tube connecting one end of said pipe with the pen, and another rubber tube extending from the other end of said pipe, and connecting with a pipe that depends in said ink well to create a siphon of ink to the pen and means supported by said ink well and adapted to maintain a constant level of ink in said well.

3. The combination with a fountain pen of a supporting table, an ink well mounted on said table, an ink reservoir supported by said ink well, means for maintaining a constant level of ink in said well, and tubing connecting said well and pen to establish a siphon.

New York, N. Y., January 5th, 1930.

LESLIE T. HAND.